(12) United States Patent
Remizov et al.

(10) Patent No.: US 9,966,591 B1
(45) Date of Patent: May 8, 2018

(54) ELECTRODE STACK PRODUCTION METHODS

(71) Applicant: Storedot Ltd., Herzeliya (IL)

(72) Inventors: Sergey Remizov, Petach Tikva (IL); Boris Brudnik, Haifa (IL); David Jacob, Kfar Yehoshua (IL); Daniel Aronov, Netanya (IL)

(73) Assignee: StoreDot Ltd., Herzeliya (IL)

( * ) Notice: Subject to any disclaimer, the term of this patent is extended or adjusted under 35 U.S.C. 154(b) by 0 days. days.

(21) Appl. No.: 15/431,793

(22) Filed: Feb. 14, 2017

Related U.S. Application Data

(60) Provisional application No. 62/435,865, filed on Dec. 19, 2016.

(51) Int. Cl.
*H01M 4/04* (2006.01)
*H01M 10/0585* (2010.01)

(52) U.S. Cl.
CPC ....... *H01M 4/0402* (2013.01); *H01M 4/0435* (2013.01); *H01M 10/0585* (2013.01)

(58) Field of Classification Search
None
See application file for complete search history.

(56) References Cited

U.S. PATENT DOCUMENTS

| | | | | |
|---|---|---|---|---|
| 2002/0007552 A1* | 1/2002 | Singleton | .......... | H01M 10/0404 29/623.3 |
| 2002/0050054 A1* | 5/2002 | Noh | ....... | H01M 4/139 29/623.3 |
| 2003/0027051 A1* | 2/2003 | Kejha | ...... | H01G 9/02 429/233 |
| 2010/0058585 A1 | 3/2010 | Remizov et al. | | |
| 2010/0075225 A1* | 3/2010 | Wilkins | ............. | H01M 4/0404 429/212 |
| 2011/0176255 A1* | 7/2011 | Sasaki | .................... | H01G 9/016 361/502 |
| 2015/0069109 A1 | 3/2015 | Mori et al. | | |
| 2016/0380250 A1 | 12/2016 | Umeyama et al. | | |

OTHER PUBLICATIONS

Arora et al. "Battery Separators", Chemical Reviews Mar. 30, 2004, vol. 104, pp. 4419-4462.
Zhang "A review on the separators of liquid electrolyte Li-ion batteries", Journal of Power Sources, Nov. 22, 2006, vol. 164, pp. 351-364.
Notice of Allowance for U.S. Appl. No. 15/846,246, dated Feb. 14, 2018.

* cited by examiner

*Primary Examiner* — Alix E Eggerding
(74) *Attorney, Agent, or Firm* — Pearl Cohen Zedek Latzer Baratz LLP

(57) ABSTRACT

Methods, stacks and electrochemical cells are provided, which improve production processes and yield flexible and durable electrode stacks. Methods comprise depositing an electrode slurry on a sacrificial film to form an electrode thereupon, wherein the electrode slurry comprises a first solvent, attaching (e.g., laminating) a current collector film, which is produced at least partly using a second solvent, onto the formed electrode, to yield a stack, wherein a binding strength of the electrode to the current collector film is higher than a binding strength of the electrode to the sacrificial film, and delaminating the sacrificial film from the electrode while maintaining the attachment of the electrode to the current collector film. Additional layers such as a cell separator and an additional electrode may be further attached using similar steps.

20 Claims, 6 Drawing Sheets

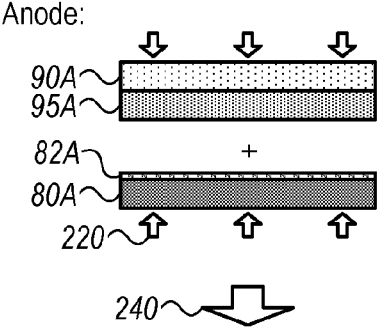
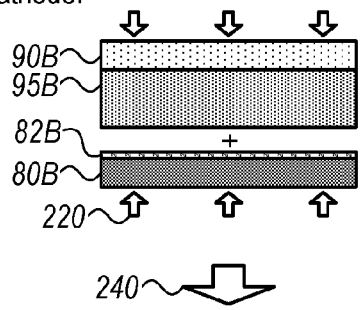
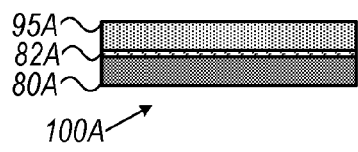
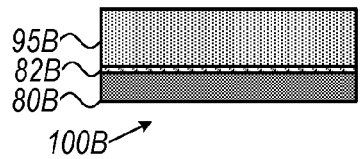
*Figure 1A*
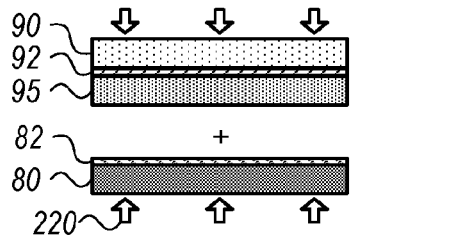
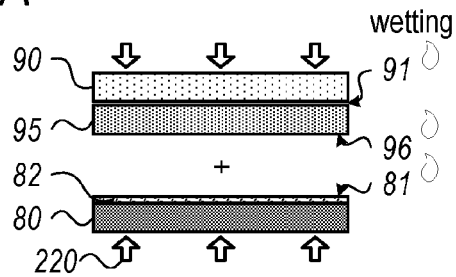
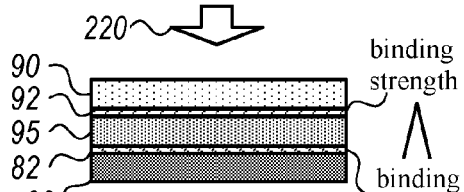
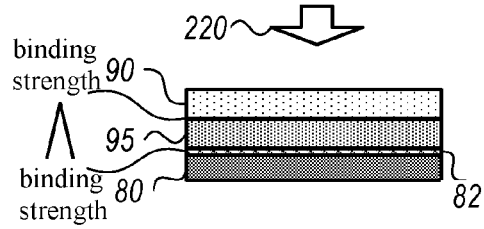
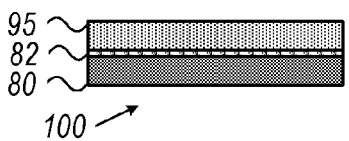
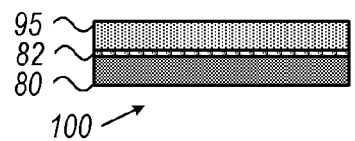
*Figure 1B*                *Figure 1C*

ELECTRODE STACK PRODUCTION METHODS

CROSS REFERENCE TO RELATED APPLICATIONS

This application claims the benefit of U.S. Provisional Patent Application No. 62/435,865, filed Dec. 19, 2016, which is hereby incorporated by reference.

BACKGROUND OF THE INVENTION

1. Technical Field

The present invention relates to the field of cells in energy storage devices, and more particularly, to manufacturing of cell stacks with electrodes.

2. Discussion of Related Art

Energy storage devices can be found in an increasing number of applications, and they diversify in structure and components. Production processes of energy storage devices are complex with respect to mechanical steps and chemical considerations involved in the production.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method comprising depositing an electrode slurry on a sacrificial film to form an electrode thereupon, wherein the electrode slurry comprises a first solvent, attaching (e.g., laminating) a current collector film, which is produced at least partly using a second solvent, onto the formed electrode, to yield a stack, wherein a binding strength of the electrode to the current collector film is higher than a binding strength of the electrode to the sacrificial film, and delaminating the sacrificial film from the electrode while maintaining the attachment of the electrode to the current collector film.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 1A-1C are high level schematic illustrations of a method of preparing electrode stacks, according to some embodiments of the invention.

DETAILED DESCRIPTION OF THE INVENTION

Figure 2:
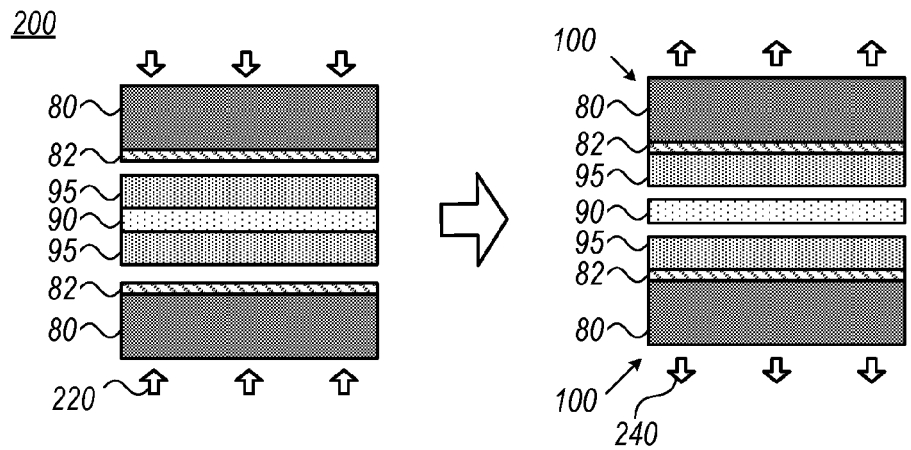
FIGS. 2-4 are high level schematic illustrations of derived processes for preparing various stacks using the method, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Methods, stacks and electrochemical cells are provided, which improve production processes and yield flexible and durable electrode stacks. Methods comprise depositing an electrode slurry on a sacrificial film to form an electrode thereupon, wherein the electrode slurry comprises a first solvent, attaching (e.g., laminating) a current collector film, which is produced at least partly using a second solvent that may be the same or different from the first solvent, onto the formed electrode, to yield a stack, wherein a binding strength of the electrode to the current collector film is higher than a binding strength of the electrode to the sacrificial film, and delaminating the sacrificial film from the electrode while maintaining the attachment of the electrode to the current collector film. Additional layers such as a cell separator and an additional electrode may be further attached using similar steps. The produced stacks may be used in electrochemical cells and in any other type of energy storage device.

FIGS. 1A-1C and 2-4 are high level schematic illustrations of method 200 of preparing electrode stacks 100, according to some embodiments of the invention. Elements from FIGS. 1A-1C and 2-4 may be combined in any operable combination and the illustration of certain elements in certain figures and not in others merely serves an explanatory purpose and is non-limiting.

FIGS. 1A-1C exemplify schematically the attachment of respective electrodes 95, namely an anode 95A and a cathode 95B, to respective current collector films 80, namely a copper (Cu) film 80A and an aluminum (Al) film 80B, respectively. Electrodes 95A, 95B (FIG. 1A) may first be formed on respective sacrificial films 90, namely a copper foil 90A and aluminum foil 90B, respectively, from respective electrode slurries involving certain solvents. Then, electrodes 95 on sacrificial films 90 are attached (220) to the corresponding current collector films 80 and sacrificial films 90 are delaminated (240) to yield respective stacks 100, namely anode-current collector stack 100A and cathode-current collector stack 100B, respectively. In certain embodiments, respective coatings 82, such as carbon and/or binder layers 82A, 82B may be applied to current collector films 80 prior to attachment 220 to enhance binding and/or improve the stack's operation. The binding strength of electrode 95 to current collector film 80 (with or without coating 82) is configured to be higher than the binding strength of electrode 95 to sacrificial film 90. In certain embodiments, layer 82 may comprise a thin carbon coating (e.g., ~1 μm thick) or a conductive adhesive. FIGS. 1B and 1C illustrate additional attachment modes disclosed below. Elements shown separately in FIGS. 1A-1C, and in other figures, may be combined to form various embodiments of the disclosed invention.

The inventors have found out that direct application of the electrode slurry on the current collector film often results in interactions between the solvents used to form the electrode slurry and solvents which were used in production of the current collector film and/or degradation of current collector 80 due to solvent ingredients. Even though these interactions may be useful for the enhancement of binding strength between the current collector and the electrode coating, these interactions, if excessive, may deteriorate the performance of the respective prior art electrodes and the prior art cells having these electrodes. Furthermore, during and after the electrode slurry application onto the current collector in the prior art, problems related to the poor wettability of the current collector by the electrode slurry may arise. These problems may result in coating defects and poor adhesion of the resulting coating to the current collector. However, the inventors have found out that forming the electrode of the sacrificial film and then transferring the electrode as disclosed herein to the current collector film solve these problems and provide flexible electrode stacks with improved performance. Moreover, disclosed embodiments may provide sufficient binding strength between the current collector and the electrode coating.

The electrode slurry may comprise a water or organic solvent, active material(s), conductive agent(s) and/or binder(s), and be dried, e.g., by evaporation of the solvent, to form electrode 95 on sacrificial film 90 prior to its attachment to current collector 80. Attachment 220 may be carried out by bringing electrode 95 into close contact with current collector 80 which may be coated by an adhesive conductive layer coating facing electrode 95. As the surface of current collector 80 may be undesirably altered by an excessive interaction with the solvent of the electrode slurry, allowing the solvent to at least partially evaporate prior to the attachment prevents or at least significantly reduces such an excessive interaction. The attachment may be carried out in a lamination process. Sacrificial film 90 may be delaminated 240 from electrode 95 after attachment 220, e.g., by peeling it off the electrode, leaving behind stack 100 with current collector 80 attached to electrode 95, which exhibits highly improved adhesion, cohesion and flexibility.

Method 200 enables fabrication of mechanically strong and flexible electrodes for energy storage devices. Advantageously, disclosed method 200 provides any of the following: improved adhesion (bonding of electrode 95 to current collector 80), improved cohesion (e.g., in electrode 95, bonding between active material, conductive additive particles and binder), improved flexibility of electrode 95, decreased binder content in electrode 95, and method 200 prevents the undesirable interaction of current collector 80 and/or adhesive layer 82 with slurry solvents, thus preventing the wettability issues or corrosion of current collector 80 which are typical in the prior art.

Advantageously, method 200 may be configured to further enable mitigation and/or avoid wettability problems as compared with the direct coating of the electrode slurry onto the current collector, carried out in the prior art. For example, common prior art practice is to use NMP (N-methyl-2-pyrrolidone) as the solvent in the electrode slurry, however NMP may attack carbon coating 82 on current collector film 80 until the slurry has dried. As a result, carbon coating 82 may not function properly.

As the risk of solvent influence on current collector 80 is reduced, selection and optimization of active materials, binders and conductive agents in the electrode slurry may be carried out to a larger extent. The formulation of the slurry may be selected to ensure the optimized packing density and related porosity of electrode 95 to provide optimal energy and power density of the energy storage device.

Sacrificial film 90 may comprise a metal foil and/or a polymeric foil or film. Sacrificial film 90 may comprise an anti-adhesive coating 92 that makes the transfer process easy. In particular, coating 92 (and/or coating 82) may be selected so that the binding strength of electrode 95 to current collector film 80 (possibly via coating 82) is higher than the binding strength of electrode 95 to sacrificial film 90 (possibly via coating 92), as indicated schematically in FIG. 1B.

Current collector film 80 may be made of various materials (e.g., copper or aluminum) and may be formed as a foil, a film, a grid or any other configuration. Coating 82 may be an adhesive conductive coating, such as a mixture of conductive particles (for example, carbon black, graphite, graphene or metal particles) and polymeric binder (for example, PVDF (polyvinylidene difluoride), PTFE (polytetrafluoroethylene), acrylic resins, elastomers, water-soluble polymers and the likes). At least one of the binders used in the electrode slurry and in the adhesive coating may be configured to increase the adhesiveness between electrode 95 and current collector film 80, in certain embodiments, under influence of temperature and/or pressure during attachment (e.g., lamination) stage 220 and possibly in delamination 240 stage, due to, for example, thermoplastic properties of the respective binder polymer. In certain embodiments, surfaces of electrode 95 and/or current collector film 80 and/or coating 82 may be wetted by an appropriate solvent to increase adhesive property, transferability and/or conformability. FIG. 1C illustrates schematically the optional wetting 91 of the interface between electrode 95 and sacrificial film 90 (possibly as a residual solvent from the electrode slurry), wetting 96 of electrode 95 and/or wetting 81 of current collector film 80 and/or coating 82.

Attachment 220 may be carried out by lamination, e.g., by hot roll press, followed by separation of respective copper or aluminum foils 90A, 90B respectively as delamination 240.

The following are more detailed examples for preparing anode stack 100A and cathode stack 100B. Anode stack 100A was prepared from a water-based anode slurry comprising carbon/tin composite as the active material, carbon black as the conductive agent and CMC (carboxymethyl cellulose) as the binder onto a copper foil substrate as sacrificial film 90. The thickness was controlled by using a doctor blade with 50 μm, 100 μm and 120 μm gaps. Coated samples were dried in a convection oven for one hour at 80° C. to evaporate the solvent and form electrode 95 on copper sacrificial film 90. In a tape test using an adhesive tape, a significant portion of the coating (electrode 95) was removed with the tape, as a simulator for current collector film 80. After the coated samples were crumpled, electrode coating flaked off (delaminated) from the copper substrate. For preparation of stack 100A, a commercial copper substrate with carbon coating was used as current collector film 80 and carbon/tin electrode was attached to carbon coating 92. The sandwiched sample was passed through a gap between a pair of stainless steel rolls heated up to 120° C. for attachment 220. After cooling down to room temperature, stack 100A was disassembled. Electrode 95, which initially was on copper sacrificial film 90 prior to the hot pressing, was transferred onto carbon coated substrate 82. Using the tape test, it was found that electrode 95 was firmly attached to carbon coated substrate 82. Over time, no crumpling or damage of electrode 95 were observed and no delamination was shown, illustrating the stability and flexibility of stack 100A.

Similarly, cathode stacks 100B may be produced using an electrode slurry containing LiCoO$_2$ as an active material, CMC as the binder, carbon black as the conductive additive and water as the solvent. The cathode slurry was coated onto a 15 micron-thick aluminum foil as sacrificial film 90 and dried at 80° C. to produce cathode 95. Cathode 95 was then transferred to a commercial aluminum foil used as current collector film 80 having carbon coating 82 on the both sides of the foil using hot roll press heated up to 80° C. In certain embodiments, anodes 110A and cathodes 110B produced as disclosed herein may exhibit improved mechanical stability.

Figure 3:
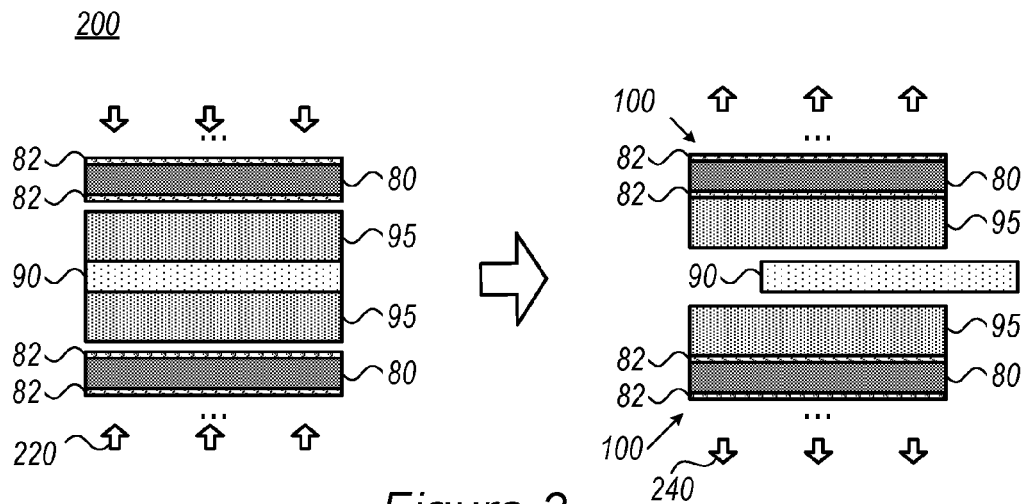
Figure 4:
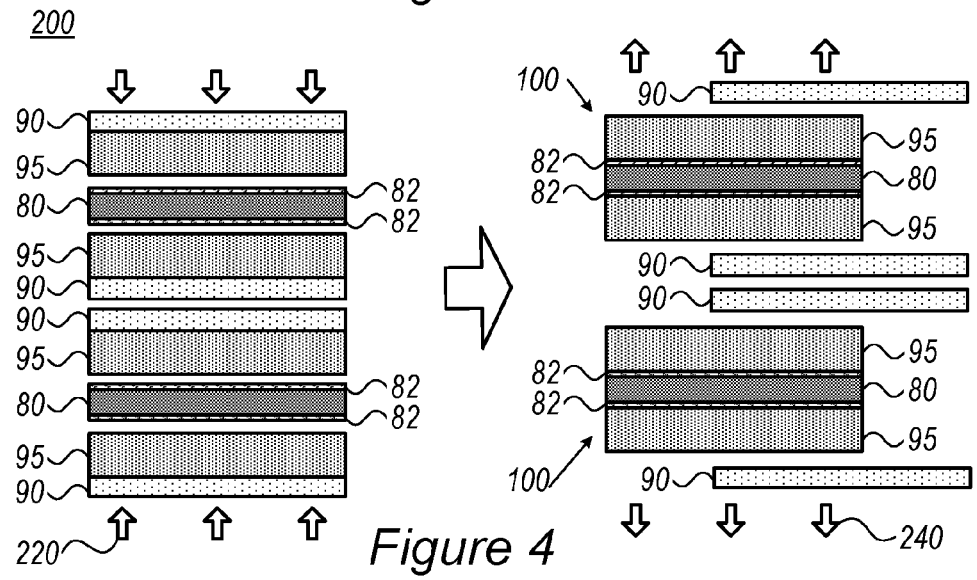

FIGS. 2-4 are high level schematic illustrations of derived processes for preparing various stacks 100 using method 200, according to some embodiments of the invention. FIG. 2 illustrates schematically the preparation of two stacks 100 simultaneously by applying electrode slurry to both sides of sacrificial film 90 to produce electrodes 95 on both sides thereof and then attaching current collector films 80 (possibly with coatings 82) to both electrodes 95 simultaneously. Delamination 240 may be synchronous or sequential to yield stacks 100. FIG. 3 illustrates schematically a similar double sided preparation with (•••) indicating possible additional layers attached on the other sides of current collector films 80 (possibly with coatings 82), possibly with additional cell components. FIG. 4 illustrates schematically simultaneous production of two double-sided stacks 100, each having current collector films 80 (possibly with coatings 82) with electrodes 95 on either side thereof. It is noted that in any of the illustrations, current collector films 80, coatings 82, electrodes 95 and sacrificial films 90 may be of different kinds in a single process, as long as the relations in binding strength illustrated in FIGS. 1B, 1C are maintained.

Figure 5:
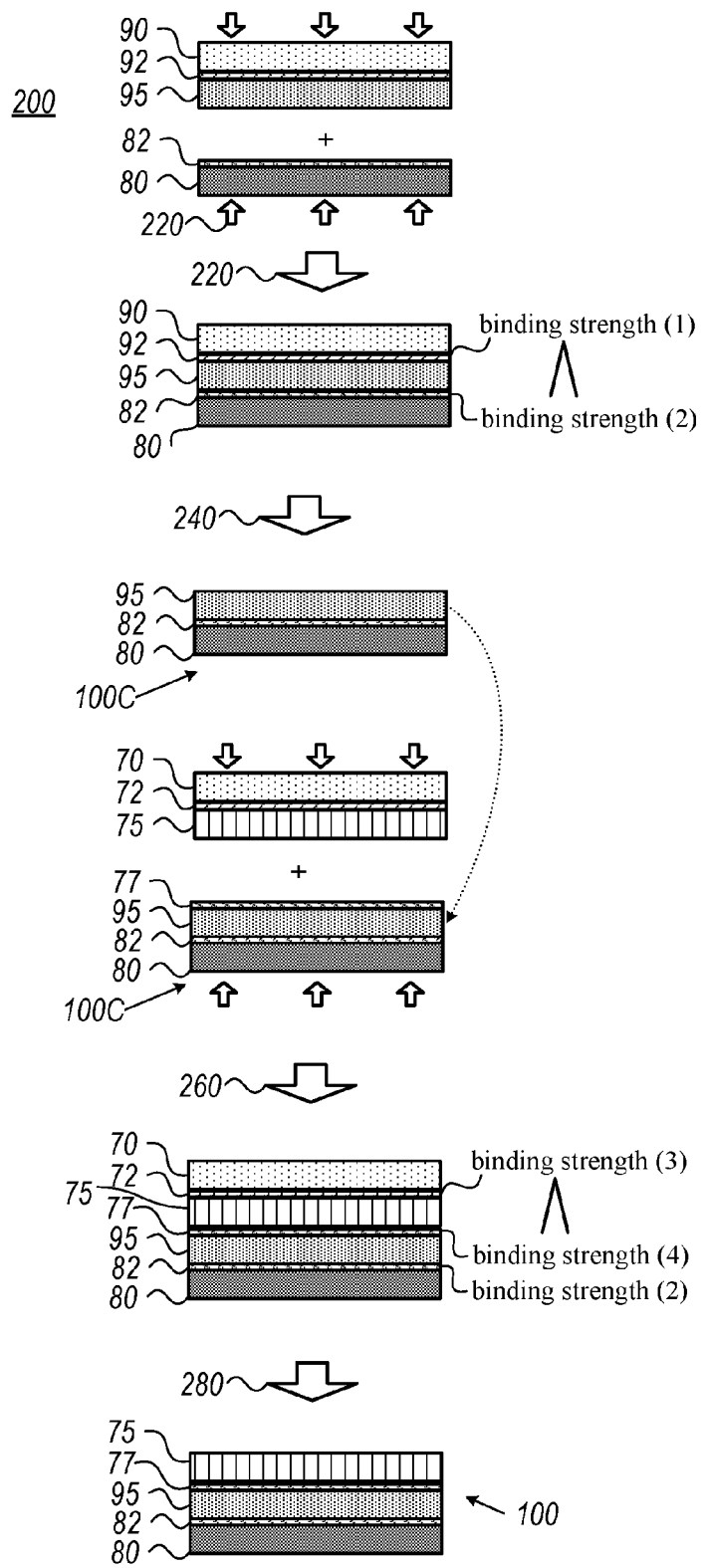
FIG. 5 is a high level schematic illustration of stacks having electrode(s) and cell separator(s) prepared by the method, according to some embodiments of the invention.

FIG. 5 is a high level schematic illustration of stacks 100 having electrode(s) and cell separator(s) 75, prepared by method 200, according to some embodiments of the invention. FIG. 5 is a highly schematic illustration of multi-stage method 200, which may be implemented with different variations to produce various stacks 100. The term "cell separator" refers to a separator film in an electrochemical cell or in any other type of energy storage device.

Following attachment 220 of electrode 95 to current collector film 80 and delamination 240 of sacrificial film 90 (with respective binding strengths (2)>(1)) to form and intermediate stack 100C, as illustrated schematically in FIGS. 1A-1C, a cell separator slurry (prepared using a third solvent which may attack electrode 95 and/or a coating 77 attached thereto if brought in direct contact with the cell separator slurry) may be spread onto a sacrificial film 70 and dried thereupon (e.g., by evaporation) to form cell separator 75. Possibly a coating 72 may be applied to sacrificial film 70 prior to the deposition of the cell separator slurry to regulate the binding strength (3) there between, and possibly coating 77 may be applied to electrode 95. At an attachment stage 260, cell separator 75 may be attached to electrode 95 and sacrificial film 70 may then be delaminated 280 to form stack 100 with current collector film 80, electrode 95 and cell separator 75, possibly with coatings 82, 77 which regulate conductivity and adhesiveness between the layers of stack 100. In particular, the binding strengths (2), (4) between layers of stack 100 are higher that binding strength (3) between cell separator 75 and sacrificial film 70 (and/or its coating 72) to maintain the stack structure through the attachment and delamination processes. Attachment and delamination processes 220, 260 and 240, 280 respectively, may be configured to enhance these differences in binding strengths, e.g., increase binding strengths (2), (4) and/or reduce binding strengths (1), (3). Application of pressure and possibly heat may be configured accordingly.

Method 200 may further comprise attaching a second electrode, possibly attached to another current collector film (not shown) to cell separator 70 along similar process steps as illustrated in FIG. 5, to produce stack 100 having an anode and a cathode, each with the corresponding current collector film, separated by a cell separator. Such stack 100 may then be used directly to form the electrochemical cell or energy storage device cell.

Figure 6:
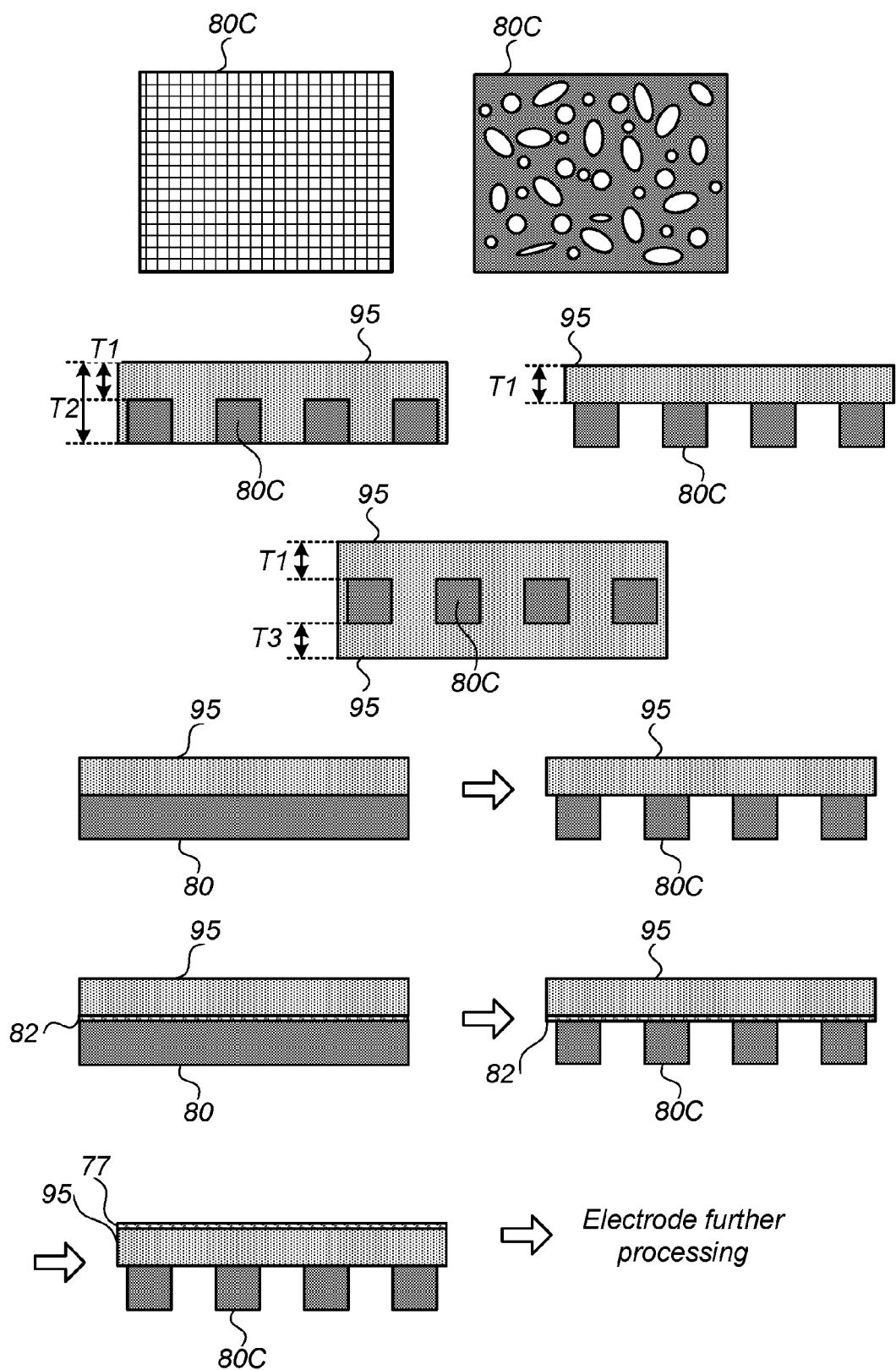
FIG. 6 is a high level schematic illustration of using structures as the current collector, which may be patterned, mesh-like and/or foam-like, according to some embodiments of the invention.

FIG. 6 is a high level schematic illustration of using structures 80C as current collector 80, which may be patterned, mesh-like and/or foam-like according to some embodiments of the invention. Structures 80C may be applicable as any type of current collector 80, 80A, 80B. Structures 80C may be patterned in various patterns, comprise a mesh or be mesh-like, comprise a foam or be foam-like, and so forth (two non-limiting examples, mesh and pattern/foam are illustrated schematically in FIG. 6). In some embodiments, structures 80C may be used as current collector 80, with the pitch, or characteristic size, and the electrode thickness being optimized for the transfer mechanism described above.

FIG. 6 further illustrates schematically various configurations for using structures 80C to produce, e.g., one sided electrodes 95 with variable thickness (T1, T2) or uniform thickness (T1) on structures 80C, and two sided electrodes 95 with variable thickness (T1, T3) or uniform thickness (for T1=T3) on structures 80C.

Method 200 may further comprise using structures which are patterned, mesh-like and/or foam-like for the current collector (stage 216, in FIG. 7), illustrated in FIG. 6 as optionally starting from a uniform structure 80 and/or optionally applying coating 82 as described above. In certain embodiments, uniform structure 80 may be patterned or otherwise modified (e.g., mechanically or chemically) to provide structures 80C. Electrode 95 may then be coated e.g., by coating 77 and be further processed (e.g., mechanically or chemically, such as by etching), possibly involving additional deposition and transfer steps to form stack 100.

Advantageously, using patterned, mesh-like and/or foam-like structures 80C may improve the access of ions to electrode 95 through open vias provided by structures 80C, possibly to both sides of electrode 95. Patterned, mesh-like and/or foam-like structures 80C may be particularly advantageous in high specific energy thin layer electrodes 95 (e.g., having thickness, e.g., T1, T2 and/or T3 of any of 10 µm, 20 µm, 50 µm, 100 µm, 200 µm, etc.).

In some embodiments, structures 80C may be used either directly as current collector 80 and/or as sacrificial film 70 for transferring electrodes 95.

In some embodiments, method 200 may be used to coat an adhesion layer in a similar manner as described for electrode 95. Particular advantages of method 200 in case of the adhesion layer result from the very small thickness of the adhesion layer, which impedes application of the adhesion layer in the prior art.

Certain embodiments comprise stacks 100 described herein, as produced by method 200, and electrochemical cells comprising stacks 100. Elements from FIGS. 1-6 may be combined in any operable combination, and the illustration of certain elements in certain figures and not in others merely serves an explanatory purpose and is non-limiting.

Figure 7:
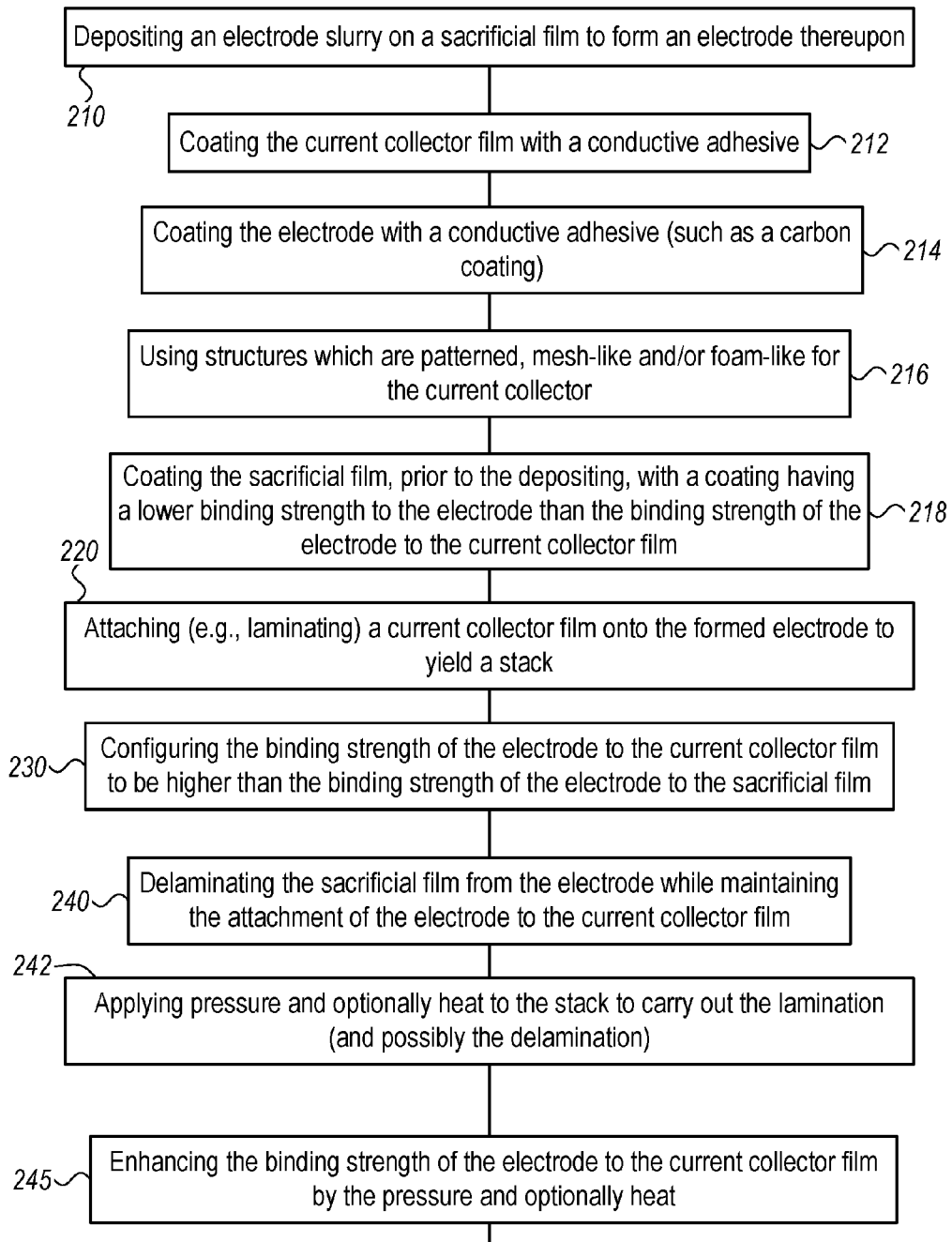
FIG. 7 is a high level flowchart illustrating the method, according to some embodiments of the invention.
Figure 7:
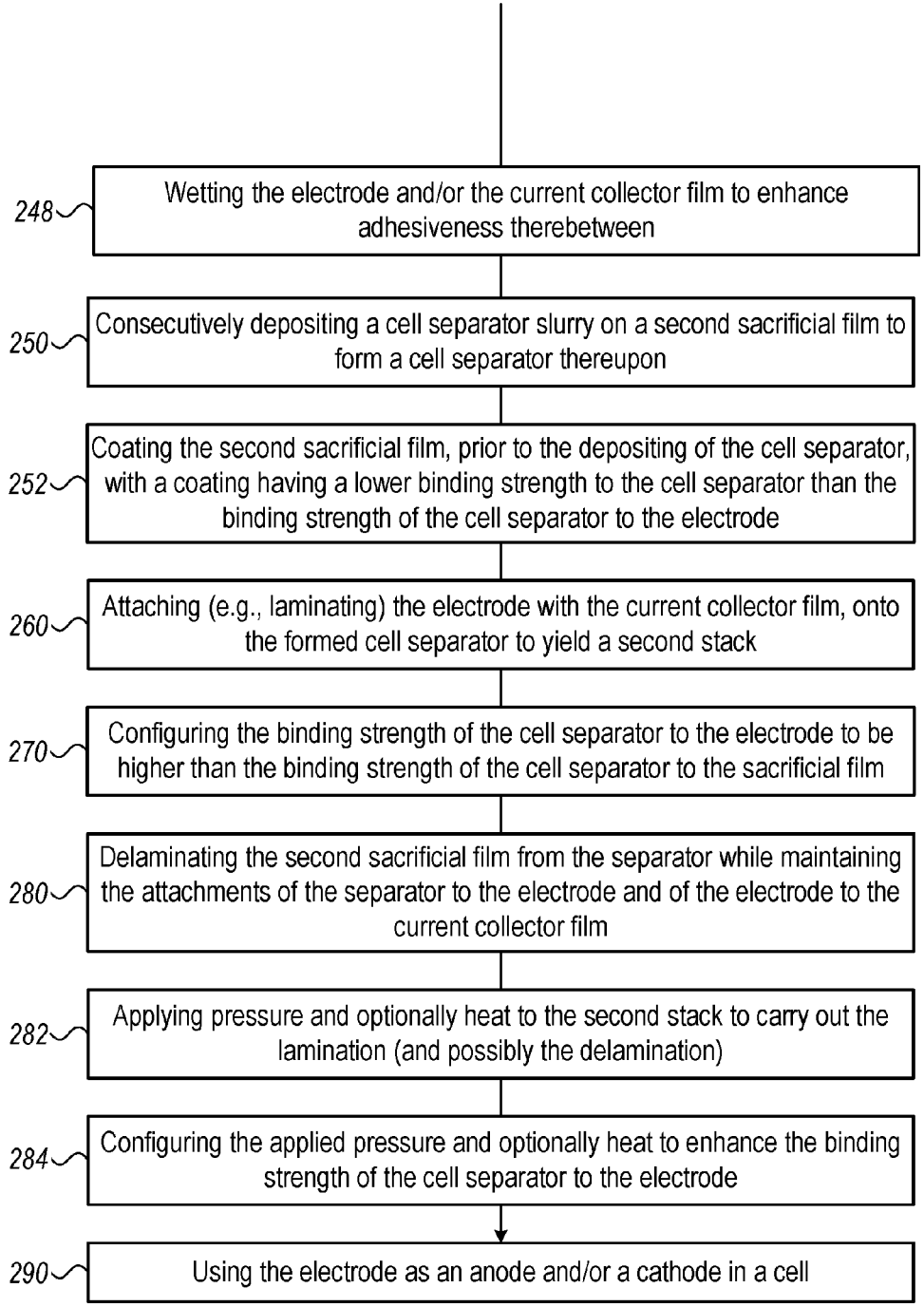

FIG. 7 is a high level flowchart illustrating a method 200, according to some embodiments of the invention. The method stages may be carried out with respect to stacks 100 described above, which may optionally be configured to implement method 200. The stages of method 200 may be implemented irrespective of their order.

Method 200 comprises depositing an electrode slurry (comprising a first solvent) on a sacrificial film to form an electrode thereupon (stage 210), attaching (e.g., laminating) a current collector film (which is produced at least partly using a second solvent) onto the formed electrode to yield a stack (stage 220). Any of the components are configured so that the binding strength of the electrode to the current collector film is higher than the binding strength of the electrode to the sacrificial film (stage 230). Method 200 may further comprise applying at least a pressure on the stack to carry out the lamination (and possibly the delamination) (stage 242), e.g., by pressing or calendaring, optionally also applying heat to carry out the lamination to enhance the binding strength of the cell separator to the electrode. Method 200 further comprises delaminating the sacrificial film from the electrode while maintaining the attachment of the electrode to the current collector film (stage 240).

Method 200 may comprise, e.g., as implementations of stage 230, any of coating the current collector film with a conductive adhesive prior to attaching 220 (stage 212); coating the electrode with a conductive adhesive such as a carbon coating prior to attaching 220 (stage 214); and/or coating the sacrificial film, prior to depositing 210, with a coating having a lower binding strength to the electrode than the binding strength of the electrode to the current collector film (stage 218).

Method 200 may optionally further comprise applying at least a pressure on the stack produced after delamination stage 240 e.g., by pressing or calendaring, optionally also applying heat and configuring the applied pressure (and optionally heat) to enhance the binding strength of the cell separator to the electrode (stage 245). In certain embodiments, method 200 may comprise wetting at least one of the electrode and the current collector film to enhance adhesiveness therebetween (stage 248).

Method 200 may comprise consecutively, depositing a cell separator slurry on a second sacrificial film to form a cell separator thereupon (stage 250), attaching (e.g., laminating) the electrode (which is attached to the current collector film) onto the formed cell separator, to yield a second stack (stage 260), and configuring a binding strength of the cell separator to the electrode to be higher than a binding strength of the cell separator to the second sacrificial film (stage 270), e.g., by application of coatings and/or adhesives as disclosed above to any of the cell separator, the second sacrificial film and/or the electrode (stage 252). For example, the second sacrificial film may be coated, prior to the depositing of the cell separator, with a coating having a lower binding strength to the cell separator than the binding strength of the cell separator to the electrode. Method 200 may further comprise applying at least a pressure on the second stack to carry out lamination (and possibly the delamination) (stage 282), e.g., by pressing or calendaring, optionally also applying heat to carry out lamination to enhance the binding strength of the cell separator to the electrode. Method 200 may further comprise delaminating the second sacrificial film from the separator while maintaining the attachments of the separator to the electrode and of the electrode to the current collector film (stage 280).

Method 200 may optionally further comprise applying at least a pressure on the second stack produced after delamination stage 280 e.g., by pressing or calendaring, optionally also applying heat and configuring the applied pressure (and optionally heat) to enhance the binding strength of the cell separator to the electrode (stage 284).

Method 200 may further comprise using the electrode as at least one of an anode and a cathode in a cell (stage 290), possibly completing at least part of the cell assembly. In certain embodiments, the cell separator may be attached by method 200 to either anode or cathode, and possibly consecutive attaching may be configured to yield a third stack of anode, cell separator and cathode.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
depositing an electrode slurry on a sacrificial film to form an electrode thereupon, wherein the electrode slurry comprises a first solvent,
attaching a coated current collector film, having a conductive coating which is produced using a second solvent, onto the formed electrode, to yield a stack, wherein a binding strength of the electrode to the coated current collector film is higher than a binding strength of the electrode to the sacrificial film, and
delaminating the sacrificial film from the electrode while maintaining the attachment of the electrode to the coated current collector film,
wherein the attaching is carried out by lamination,
and wherein the lamination is carried out by applying pressure on the stack by pressing or calendaring without heating the stack.

2. The method of claim 1, further comprising configuring the applied pressure to enhance the binding strength of the electrode to the coated current collector film.

3. The method of claim 1, further comprising using the electrode as at least one of an anode and a cathode in a cell.

4. A flexible battery having at least one electrode that is prepared by the method of claim 1.

5. The method of claim 1, wherein, in the stack, electrode slurry material and conductive coating material do not mix and are separate, and the first and second solvent do not interact.

6. A method comprising:
depositing an electrode slurry on a sacrificial film to form an electrode thereupon, wherein the electrode slurry comprises a first solvent,
attaching a coated current collector film, having a conductive coating which is produced using a second solvent, onto the formed electrode, to yield a stack, wherein a binding strength of the electrode to the coated current collector film is higher than a binding strength of the electrode to the sacrificial film,
delaminating the sacrificial film from the electrode while maintaining the attachment of the electrode to the coated current collector film, and
coating the current collector film with the conductive coating, which is a conductive adhesive, prior to the attaching.

7. The method of claim 6, further comprising coating the sacrificial film, prior to the depositing, with a coating having a binding strength to the electrode that is lower than the binding strength of the electrode to the coated current collector film.

8. The method of claim 7, wherein the attaching is carried out by lamination, and the method further comprises applying at least a pressure on the stack to carry out the lamination, wherein the coating of the sacrificial film is configured to have the lower binding strength at least upon the pressure application.

9. The method of claim 6, further comprising configuring the coated current collector film to have a patterned, mesh-like and/or foam-like structure.

10. The method of claim 6, further comprising using the electrode as at least one of an anode and a cathode in a cell.

11. A flexible battery having at least one electrode that is prepared by the method of claim 6.

12. A method comprising:
depositing an electrode slurry on a sacrificial film to form an electrode thereupon, wherein the electrode slurry comprises a first solvent,
attaching a coated current collector film, having a conductive coating which is produced using a second solvent, onto the formed electrode, to yield a stack, wherein a binding strength of the electrode to the coated current collector film is higher than a binding strength of the electrode to the sacrificial film,
delaminating the sacrificial film from the electrode while maintaining the attachment of the electrode to the coated current collector film, and
coating the electrode with a conductive adhesive prior to the attaching.

13. The method of claim 12, further comprising coating the current collector film with a carbon coating that is attached to the electrode prior to the attaching.

14. A method comprising:
depositing an electrode slurry on a sacrificial film to form an electrode thereupon, wherein the electrode slurry comprises a first solvent,
attaching a coated current collector film, having a conductive coating which is produced using a second solvent, onto the formed electrode, to yield a stack, wherein a binding strength of the electrode to the coated current collector film is higher than a binding strength of the electrode to the sacrificial film,
delaminating the sacrificial film from the electrode while maintaining the attachment of the electrode to the coated current collector film, and
wetting at least one of the electrode and the coated current collector film to enhance adhesiveness therebetween.

15. A method comprising:
depositing an electrode slurry on a sacrificial film to form an electrode thereupon,
attaching a current collector film onto the formed electrode, to yield a stack, wherein a binding strength of the electrode to the current collector film is higher than a binding strength of the electrode to the sacrificial film,
delaminating the sacrificial film from the electrode while maintaining the attachment of the electrode to the current collector film, and, consecutively,
depositing a cell separator slurry on a second sacrificial film to form a cell separator thereupon,
attaching the electrode, which is attached to the current collector film, onto the formed cell separator, to yield a second stack, wherein a binding strength of the cell separator to the electrode is higher than a binding strength of the cell separator to the second sacrificial film, and
delaminating the second sacrificial film from the separator while maintaining the attachments of the separator to the electrode and of the electrode to the current collector film.

16. The method of claim 15, wherein the attaching of the electrode is carried out by lamination.

17. The method of claim 16, further comprising applying at least a pressure on the second stack to carry out the lamination.

18. The method of claim 15, further comprising configuring the applied pressure to enhance the binding strength of the cell separator to the electrode.

19. The method of claim 15, further comprising coating the second sacrificial film, prior to the depositing of the cell separator, with a coating having a binding strength to the cell separator that is lower than the binding strength of the cell separator to the electrode.

20. The method of claim 15, wherein the current collector film is coated by a conductive coating.

\* \* \* \* \*